(12) United States Patent
Kellum et al.

(10) Patent No.: US 9,639,723 B1
(45) Date of Patent: May 2, 2017

(54) CONDITIONAL RFID

(71) Applicant: Patent Navigation Inc., Woodinville, WA (US)

(72) Inventors: John M Kellum, Woodinville, WA (US); James A Billmaier, Woodinville, WA (US); David P Billmaier, Woodinville, WA (US)

(73) Assignee: Patent Navigation, Kirkland, WA (US)

( * ) Notice: Subject to any disclaimer, the term of this patent is extended or adjusted under 35 U.S.C. 154(b) by 176 days.

(21) Appl. No.: 14/585,177

(22) Filed: Dec. 29, 2014

Related U.S. Application Data

(63) Continuation of application No. 11/998,874, filed on Nov. 30, 2007, now Pat. No. 8,994,533.

(60) Provisional application No. 60/872,129, filed on Nov. 30, 2006.

(51) Int. Cl.
| | |
|---|---|
| *G08B 13/14* | (2006.01) |
| *H04Q 5/22* | (2006.01) |
| *H04B 5/00* | (2006.01) |
| *G01P 15/00* | (2006.01) |
| *G06K 7/10* | (2006.01) |

(52) U.S. Cl.
CPC ................... *G06K 7/10366* (2013.01)

(58) Field of Classification Search
CPC ......... G06F 2221/2103; G06F 13/4217; G08B 21/0275; G08B 13/1427; G08B 13/2417; H04L 63/08; H04L 9/3271; H04M 1/72572; H04W 4/021; G01S 13/75; G01S 13/765; G01S 13/878; G01S 15/876; G01S 5/30

USPC ......... 340/10.1, 572.1, 8.1, 10.3, 10.4, 10.5, 340/10.52, 531, 539.1, 539.11, 539.13, 340/539.26, 539.32
See application file for complete search history.

(56) References Cited

U.S. PATENT DOCUMENTS

| | | | |
|---|---|---|---|
| RE27,119 E | 4/1971 | Seeber | |
| 3,747,068 A | 7/1973 | Bruner et al. | |
| 3,831,091 A * | 8/1974 | Kanitz | H04N 1/33323 358/435 |
| 3,905,007 A * | 9/1975 | Koesy | G01S 15/74 367/106 |
| 3,938,146 A * | 2/1976 | Dano | G01S 13/784 326/59 |
| 4,174,519 A * | 11/1979 | Poli | G01S 13/781 342/40 |
| 4,311,986 A * | 1/1982 | Yee | H04Q 9/14 340/10.31 |
| 4,949,239 A * | 8/1990 | Gillett, Jr. | G06F 13/4217 710/108 |
| 4,972,315 A | 11/1990 | Yamasaki et al. | |
| 5,030,807 A | 7/1991 | Landt et al. | |
| 5,448,523 A | 9/1995 | Lewis et al. | |
| 5,490,079 A * | 2/1996 | Sharpe | G01S 19/14 455/517 |
| 5,673,018 A | 9/1997 | Lowe et al. | |
| 5,809,536 A * | 9/1998 | Young | G06F 12/082 711/119 |

(Continued)

FOREIGN PATENT DOCUMENTS

DE WO 2005122071 A2 * 12/2005 ......... G06K 19/0723

*Primary Examiner* — Fekadeselassie Girma
(74) *Attorney, Agent, or Firm* — FSP LLC

(57) ABSTRACT

A RFID tag includes logic to compare information in a received signal with conditional response criteria, and to respond to the received signal with an RFID only if the information satisfies the conditional response criteria.

5 Claims, 2 Drawing Sheets

(56) References Cited

U.S. PATENT DOCUMENTS

| | | | |
|---|---|---|---|
| 5,933,079 A | 8/1999 | Frink | |
| 6,058,374 A | 5/2000 | Guthrie et al. | |
| 6,097,301 A | 8/2000 | Tuttle | |
| 6,370,617 B1 | 4/2002 | Lu et al. | |
| 6,476,708 B1 * | 11/2002 | Johnson | G06K 7/0008 340/10.34 |
| 6,499,656 B1 * | 12/2002 | Marsh | G06K 7/10039 235/375 |
| 6,611,198 B1 * | 8/2003 | Geiszler | G06K 7/0008 340/10.1 |
| 6,674,368 B2 | 1/2004 | Hawkins et al. | |
| 6,789,729 B1 | 9/2004 | Solan et al. | |
| 6,897,763 B2 | 5/2005 | Schulmerich et al. | |
| 7,015,801 B1 | 3/2006 | Juzswik | |
| 7,598,905 B2 * | 10/2009 | Stayton | G01S 7/4004 342/165 |
| 7,646,330 B2 * | 1/2010 | Karr | G01S 13/765 340/10.1 |
| 7,728,724 B1 | 6/2010 | Scalisi et al. | |
| 7,844,505 B1 * | 11/2010 | Arneson | G06Q 10/087 340/10.2 |
| 8,284,034 B2 * | 10/2012 | Stewart | G06K 7/0008 235/462.13 |
| 8,344,853 B1 * | 1/2013 | Warner | G06K 19/07309 340/10.1 |
| 8,610,565 B2 * | 12/2013 | Park | G06K 19/0717 340/10.41 |
| 9,398,416 B2 * | 7/2016 | Stringer, II | H04W 4/023 |
| 2001/0035823 A1 * | 11/2001 | Curwen | G01S 15/876 340/573.4 |
| 2002/0086648 A1 * | 7/2002 | Wilhelmsson | H04B 7/0814 455/101 |
| 2002/0167405 A1 * | 11/2002 | Shanks | G06K 7/0008 340/572.1 |
| 2003/0019929 A1 * | 1/2003 | Stewart | G06K 7/0008 235/385 |
| 2003/0071717 A1 | 4/2003 | Hagl et al. | |
| 2004/0037152 A1 | 2/2004 | Ooishi | |
| 2004/0066278 A1 * | 4/2004 | Hughes | G06F 21/31 340/10.1 |
| 2004/0178270 A1 * | 9/2004 | Pradhan | G01S 13/74 235/462.13 |
| 2005/0159823 A1 * | 7/2005 | Hayes | G05B 15/02 700/19 |
| 2005/0212693 A1 * | 9/2005 | Friedrich | G06K 7/0008 342/42 |
| 2005/0221844 A1 * | 10/2005 | Trethewey | H04M 1/72572 455/456.6 |
| 2005/0263591 A1 | 12/2005 | Smith | |
| 2006/0038676 A1 | 2/2006 | Richards | |
| 2006/0038685 A1 * | 2/2006 | Kiwada | B41J 11/0015 340/572.1 |
| 2006/0109100 A1 * | 5/2006 | Iijima | B60C 23/0433 340/445 |
| 2006/0284727 A1 * | 12/2006 | Steinke | G06K 19/0723 340/10.31 |
| 2007/0046432 A1 * | 3/2007 | Aiouaz | G06K 17/0022 340/10.1 |
| 2007/0069895 A1 * | 3/2007 | Koh | G06K 19/02 340/572.1 |
| 2007/0188342 A1 * | 8/2007 | Valeriano | G06K 17/00 340/8.1 |
| 2007/0200681 A1 * | 8/2007 | Colby | G06K 19/025 340/10.51 |
| 2007/0200684 A1 * | 8/2007 | Colby | G06K 19/07345 340/10.51 |
| 2007/0205896 A1 | 9/2007 | Beber et al. | |
| 2007/0222591 A1 * | 9/2007 | Kimata | G06K 19/0717 340/539.26 |
| 2007/0273481 A1 * | 11/2007 | Soleimani | H01Q 1/2225 340/10.1 |
| 2008/0109899 A1 * | 5/2008 | Rijnswou Van | G06K 19/0723 726/21 |
| 2008/0150792 A1 * | 6/2008 | Stayton | G01S 7/4004 342/173 |
| 2008/0284600 A1 * | 11/2008 | Drzaic | A62B 99/00 340/572.1 |
| 2010/0151881 A1 * | 6/2010 | Jang | H04M 1/72552 455/456.1 |
| 2011/0080262 A1 * | 4/2011 | Richardson | G01S 5/0027 340/8.1 |

* cited by examiner

CONDITIONAL RFID

PRIORITY CLAIM

This application claims priority and benefit as a continuation of U.S. application Ser. No. 11/998,874, filed on Nov. 30, 2007, which claims priority and benefit under 35 USC 119 to U.S. application Ser. No. 60/872,129, filed on Nov. 30, 2006, each of which is incorporated by reference herein in their entirety.

TECHNICAL FIELD

The present disclosure relates to radio frequency id devices.

BACKGROUND

Radio frequency id devices (RFIDs) are becoming more prevalent, especially in applications involving inventory tracking and shipping. As RFIDs become more prevalent, the need increases for more intelligent reporting of RFID information.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

An RFID tag may include and/or involve logic to compare information in a received signal with conditional response criteria, and to respond to the received signal with an RFID response only if the information satisfies the conditional response criteria.

The RFID may perform or cause a comparison of an ID in the received signal with its own ID, and/or compare type information in the received signal with its type, and respond accordingly.

The RFID may perform or cause a comparison of information in a received signal with data received and stored by the RFID tag, and/or with state information. The state information may include information about an item to which the RFID is attached or associated.

The RFID may compare a location indication in the received signal with a location indication of the RFID tag. The RFID may perform or cause a comparison of a request that the RFID tag return acquired and stored information with an indication of whether or not the RFID tag has acquired and stored information.

Depending on information obtained from the received signal, the RFID may respond with no response, with its RFID, or with other information which may or may not also include its RFID.

Depending on information obtained from the received signal, the RFID may respond with false or misleading information such as an identification which is not its RFID.

After a signal is received and the RFID responds appropriately, a second signal may be received by the RFID. The RFID may recognize an association of the second signal with the first. The response of the RFID may depend on the recognition of that association. Recognition of association may comprise recognition of the extent of the time interval between the first and second signal. Recognition of association may comprise recognition of a device identifier which is common to the first and second signal. Recognition of association may depend on information, such as a password or other identifier, which is sent by both the first and second signal. Recognition of association may depend on closeness of location between the first and second signal.

A first signal received by an RFID may act to validate or permit the sending of information by the RFID in response to a second signal. For example, a password which is sent by the first signal may be recognized by the RFID as providing permission to send information. The RFID may then respond to the second signal by sending that information.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

RFID Including Conditional Response Logic

Figure 1:
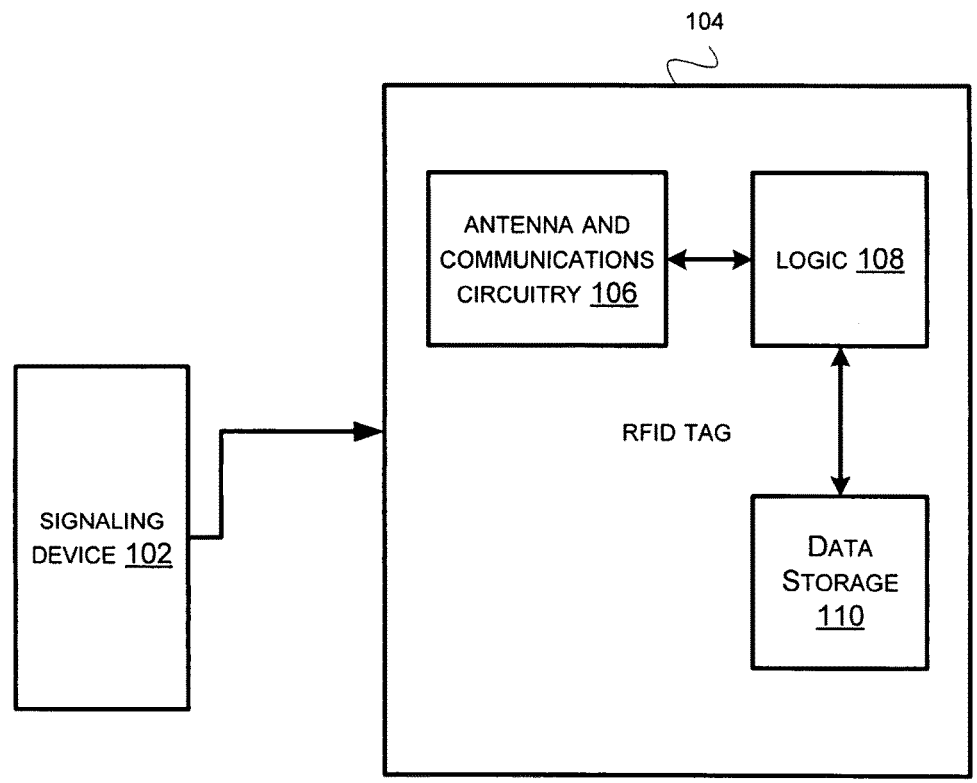
FIG. 1 is a block diagram of an embodiment of an RFID device including conditional response logic.

FIG. 1 is a block diagram of an embodiment of an RFID including conditional response logic. The RFID is implemented as a "tag", e.g. a small device suitable for affixing to inventory, clothing, or capable of being carried in a wallet or placed inside a watch, etc. Typically, the "tag" will lack an internal power source, and will instead rely upon use of incident power from an RFID signaling device in order to operate internal logic.

The RFID signaling system includes, but may not be limited to, a signaling device 102, an RFID tag 104, antenna and communications circuitry 106, logic 108, and data storage 110. Other elements and/or couplings among the elements have been omitted as they would be apparent to skilled practitioners in the relevant art(s).

The signaling device 102 is a device such as an RFID reader that transmits a signal to the RFID tag 104. The RFID tag 104 is a small object with circuitry which enables it to receive and transmit signals over a short distance. The signals transmitted may be in the radio frequency spectrum or may be in the microwave (e.g. 5.8 Gigahertz) spectrum. RFID tags transmitting signals in the microwave spectrum are sometimes called microwave tags. Herein, signals transmitted in either spectrum may be referred to as RF or radio frequency signals, and the inventive aspects are not dependent on the signaling spectrum. The RFID tag may be contained within or attached to another object such as a device, a container, or an article of clothing. The antenna and communications circuitry 106 provides a capability to receive and transmit the signals.

The logic 108 provides a capability to analyze information received including information contained in incoming RF communications. The information storage 110 is a persistent or permanent memory. Some RFID tag implementations may contain only memory into which information has been written once and will not be overwritten (i.e. read-only). An example of such information is a tag ID that may be transmitted to the RFID from the signaling device 102. Other RFID implementations may alternatively or additionally contain a data area or areas which may be overwritten (i.e. read-writable).

In general, the logic 108 may operate to compare information in a received signal with conditional response criteria, and respond to the received signal with an RFID only if the information satisfies the conditional response criteria. Examples of conditional response criteria are provided in conjunction with the description of FIG. 2.

Other examples and/or embodiments of the signaling device 102, the RFID tag 104, antenna and communications circuitry 106, and information storage 110 may be apparent to skilled practitioners in the relevant art(s).

RFID Conditional Response Process

Figure 2:
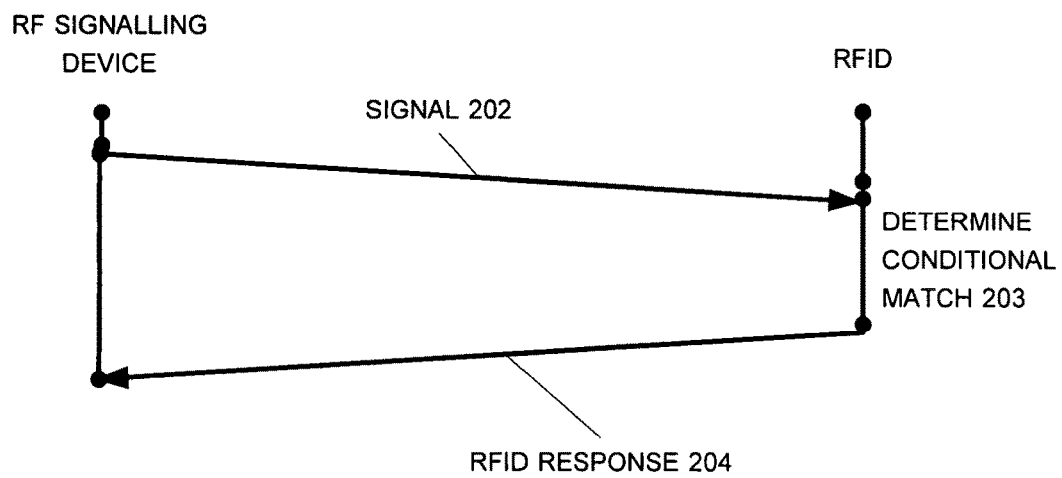
FIG. 2 is an action flow diagram of an embodiment of an RFID conditional response process.

FIG. 2 is an action flow diagram of an embodiment of an RFID conditional response process.

At 202 the RFID receives a signal from an RF signaling device, such as an RFID reader. At 203 the RFID determines whether the signal contains information invoking a conditional response. If a conditional response is warranted, the RFID responds at 204.

Types of Conditional Response

Various manners of conditional response may be implemented, including but not limited to:

comparing an ID of a radio tag in a received signal with an ID of the RFID tag, and responding only if the IDs match;

comparing RDIF type (e.g. group, classification) information in the received signal with a type of the RFID tag, and responding only if the types match;

comparing information in a received signal with data received and stored by the RFID tag, and responding only if stored data is present, or if the stored data matches a criteria specified by the received signal;

comparing information in the received signal with RFID tag state information, and responding only if the RFID is in a state consistent with responding;

comparing a location indication in the received signal with a location indication of the RFID tag, and responding only if the location indication of the tag is consistent with the location specified in the received signal;

comparing a request that the RFID tag return acquired and stored information with an indication of whether or not the RFID tag has acquired and stored information.

Depending on information obtained from the received signal, the RFID may respond with no response, with its RFID, or with other information which may or may not also include its RFID.

Depending on information obtained from the received signal, the RFID may respond with false or misleading information such as an identification which is not its RFID.

After a signal is received and the RFID responds appropriately, a second signal may be received by the RFID. The RFID may recognize an association of the second signal with the first. The response of the RFID may depend on the recognition of that association. Recognition of association may comprise recognition of the extent of the time interval between the first and second signal. Recognition of association may comprise recognition of a device identifier which is common to the first and second signal. Recognition of association may depend on information, such as a password or other identifier, which is sent by both the first and second signal. Recognition of association may depend on closeness of location between the first and second signal.

A first signal received by an RFID may act to validate or permit the sending of information by the RFID in response to a second signal. For example, a password which is sent by the first signal may be recognized by the RFID as providing permission to send information. The RFID may then respond to the second signal by sending that information.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A device comprising:
    an RFID tag, the RFID tag comprising an RF transceiver configured to receive signals from an RFID reader device;
    logic to operate the RF transceiver to respond to a received signal from the RFID reader device with a unique radio frequency id (RFID) in a signal directed to the RFID reader device;
    logic to compare a location indication in the received signal from the RFID reader device with a location indication stored by the RFID tag, and to respond to the received signal from the RFID reader device with the RFID in a response signal directed specifically to the RFID reader device only if the location indication stored by the RFID tag is co-extensive with the location indication in the received signal from the RFID reader device; and
    logic to compare an operational state specified in the received signal with an operational state of the RFID tag, and to respond to the received signal from the RFID reader device with the RFID only if the operational state of the RFID tag matches the operational state specified in the received signal.

2. The device of claim 1, further comprising:
    logic to compare an RFID type in the received signal with a type of the RFID tag, and to respond to the received signal with the RFID only if the RFID type in the received signal from the RFID reader device from the and the type of the RFID tag match.

3. The device of claim 1, further comprising:
    logic to compare data in the received signal with data received and stored by the RFID tag prior to receipt of the received signal, and to respond with the RFID only if the data received and stored by the RFID tag is present in an RFID memory.

4. The device of claim 3, further comprising:
    to respond with the RFID only if the data received and stored by the RFID tag is present in the RFID memory and the data received and stored by the RFID tag matches a criteria specified by the received signal.

5. The device of claim 1, further comprising:
    logic to apply a password in the received signal from the RFID reader device with a password stored in the RFID memory and to respond to the received signal from the RFID reader device only if the password in the received signal from the RFID reader device matches the password stored in the RFID memory.

\* \* \* \* \*